United States Patent
Elseviers et al.

(10) Patent No.: US 6,296,892 B1
(45) Date of Patent: Oct. 2, 2001

(54) BEVERAGES FOR ENHANCED PHYSICAL PERFORMANCE

(75) Inventors: Myriam Elseviers, Kampenhout; Harald Wilhelm Walter Röper, Brussels, both of (BE); Hubert Köbernick, Krefeld (DE)

(73) Assignee: Cerestar Holding B.V., Sas van Gent (NL)

( * ) Notice: Subject to any disclaimer, the term of this patent is extended or adjusted under 35 U.S.C. 154(b) by 0 days.

(21) Appl. No.: 09/119,734

(22) Filed: Jul. 21, 1998

(30) Foreign Application Priority Data

Jul. 22, 1997 (GB) .................................. 9715340

(51) Int. Cl.[7] ...................................... A23L 1/28

(52) U.S. Cl. .............................. 426/653; 514/23; 514/53; 514/54

(58) Field of Search .............. 426/653; 514/23, 514/53, 54

(56) References Cited

U.S. PATENT DOCUMENTS

| 4,312,856 | 1/1982 | Korduner | 424/145 |
|---|---|---|---|
| 5,294,606 | * 3/1994 | Hastings | 514/53 |
| 5,397,786 | * 3/1995 | Simone | 514/300 |

FOREIGN PATENT DOCUMENTS

| 459 108 A2 | * 12/1991 | (EP) . |
|---|---|---|
| 582 518 A2 | * 2/1994 | (EP) . |
| 0 652 012 | 5/1995 | (EP) . |
| 0 679 339 | 11/1995 | (EP) . |
| 89/04165 | 5/1989 | (WO) . |
| 91/12734 | 9/1991 | (WO) . |
| 95/22260 | 8/1995 | (WO) . |
| 95/22562 | 8/1995 | (WO) . |

OTHER PUBLICATIONS

Coca–Cola Brand Information (Powerade) [online]. The Coca–Cola Company, 1998 [retrieved on May 17, 2000]. Retrieved from the Internet: <URL: http://www.thecoca–colacompany.com/brands/index.html>. (First sold in 1990).*

Gatorade Product Information [online]. The Quaker Oats Company, date unknown [retrieved on May 17, 2000]. Retrieved from the Internet: <URL:www.gatorade.com/content.cfm?UpperIDList=%2D1%2C4%2C17>. (First used in 1965).*

Glycomax Product Information [online]. GlycoMax. 2000 [retrieved on May 17, 2000]. Retrieved from the Internet: <URL:www.glycomax.com/about.htm>, 2000.*

Carbo Pump Endurance Drink and White Lightning Recovery Drink Product Information [online]. Science Foods, date unknown [retrieved on May 17, 2000]. Retrieved from the Internet: <URL:www.sciencefoods.com/products/products.htm>, 2000.*

XL–1 Product Information [online]. XL1. 1998 [retrieved on May 17, 2000]. Retrieved from the Internet: <URL:www.xl1.com/xl1study.html#composition>, 1998.*

Carbo Force Natural Energy Drink [online]. American Body Building Products. date unknown [retreived on May 17, 2000]. Retrieved from the Internet:<URL:www.getbig.com/abb/drinks/carboforce.htm>, 2000.*

Consumer Fact Sheet—Questions Most Frequently Asked About Sugar, The Sugar Association, 1982.*

"Metabolic Pathways", Sigma Catalog, 1997.*

Ultra Slim Fast, Slim Fast Food Company, 1994.*

* cited by examiner

*Primary Examiner*—Ralph Gitomer
*Assistant Examiner*—Devesh Khare
(74) *Attorney, Agent, or Firm*—Fitch, Even, Tabin & Flannery

(57) ABSTRACT

The present invention discloses an isotonic beverage product for direct increase of the muscular ATP level consisting essentially of a solution of D-ribose and blood glucose increasing monosaccharides and oligosaccharides and/or hydrogenated glucose syrups. These drinks serve to increase the overall performance during physical exercise and at the same time diminish fatigue.

8 Claims, No Drawings

BEVERAGES FOR ENHANCED PHYSICAL PERFORMANCE

TECHNICAL FIELD

A sports drink is described. The drink, which is especially useful before, during and after high physiological activity of the body, is specifically developed to increase the production of the energy carrier ATP. At the same time the glucose level of the blood is kept at a high level.

BACKGROUND OF THE INVENTION

There are a number of liquid compositions or diluted mixtures on the market by the name of 'Activity drinks', 'Sports drinks', 'Energy drinks' or 'Nutrient drinks'. These drinks are reported to solve problems with respect to the loss of carbohydrates, electrolytes, vitamins, minerals, amino acids, and other important nutrients which occurs during heavy exercise. Physical exercise can be distinguished in different categories i.e. those requiring strength, strength and speed or endurance. In practice this can be heavy work, muscle activity under severe conditions (e.g. high temperature, high altitude), leisure sports or athletic performance.

Muscle activity is primarily based on a very fundamental biochemical mechanism, the breakdown of energy-rich phosphate bonds (ATP, adenosine triphosphate). ATP is the direct source of energy for muscle work and is in fact the only form of chemical energy, which can be converted by the muscle into mechanical work.

During high physical activity of the body the ATP level in the muscles diminishes rapidly. Several substrates are available as sources for replenishing the ATP.

When there is low physical activity fats are used for ATP production, at higher activity rates, glycogen in the muscle is the major energy supply. The energy from glycogen (carbohydrate) is released in exercising muscles up to three times as fast as the energy from fat. During the last half century it has been repeatedly demonstrated that exercise of a moderate intensity cannot be maintained when carbohydrate stores within the body are not sufficient or sufficiently available. Carbohydrates are the fuel from which body cells obtain energy for cellular activities and the major portion of carbohydrates utilised by the body are used for ATP production. The energy required for developing athletic activity, and indeed for all muscular work, comes primarily from the oxidation of glycogen stored in the muscles.

Glycogen can be used either relatively slowly via the complete glycolysis and oxidative phosphorylation to form carbon dioxide, water and 38 moles of ATP per mole of glucose. When exercise is very intensive, i.e. so intensive that the respiratory and cardiovascular systems of the body do not have sufficient time to deliver oxygen to the muscles, the energy for this activity will be delivered almost exclusively from anaerobic metabolism, and much less ATP per molecule of glucose is produced. Under these circumstances the athlete accumulates an 'oxygen debt' and the athlete's tissues use a mechanism of carbohydrate oxidation that requires no oxygen. The by-product of this oxygen debt is lactic acid. After recovery the system will show a net decrease in total carbohydrate (muscle glycogen) content. This decrease is equivalent to the amount of carbohydrate expended in performing the muscular work.

Fatigue during high intensity exercise may be viewed as the result of a simple mismatching between the rate at which ATP is utilised and the rate at which ATP is produced in working muscles. The attention, given over the last two decades to the study of the limitations of ATP production, leads to the conclusion that the cause of fatigue may be the inability of the metabolic machinery to provide ATP fast enough for the energy needs of the working muscles to sustain force production (D. MacLeod in "Exercise—Benefits, limits and adaptations—1987).

Furthermore, during relatively extended periods of heavy muscle work, the work capacity of an individual is limited by several factors, such as too low blood sugar concentration and loss of liquid by transpiration. In the last decade the use of liquid drinks containing carbohydrates during exercise has become more and more accepted as a stimulus during endurance performance. As a result, these days it is general practice to ingest substantial amounts of carbohydrate in a liquid form during endurance competition events. Supplementation with carbohydrate containing fluids is employed to prolong exercise and improve the performance of high intensity endurance exercise. Benefits to be obtained are: maintenance of fluid balance and an increase in the availability of carbohydrate, the primary substrate for the muscular ATP production.

Carbohydrate feedings during exercise appear to delay fatigue by as much as 30 to 60 minutes. (E. F. Coyle in Advances in Nutrition and Top Sport—Medicine and Sport Science—Volume 32-1991). During the last decade much attention has been focused on the optimum form and type of carbohydrate beverages to prolong physical performance.

Although considerable amounts of carbohydrates can be ingested, not all of the exogenous carbohydrates emptied from the stomach are oxidize during exercise. Gastric emptying rate decreases with increasing carbohydrate concentration and osmolality. Consequently highly concentrated carbohydrate solutions have been observed to increase the frequency of gastrointestinal distress in endurance athletes. According to N. J. Rehrer (J. Appl. Physiol. 72(2): 468–475, 1992) the volume of beverage emptied from the stomach is significantly influenced by the beverage composition. Specially, the concentration of the carbohydrates is of particular importance. The effects of osmolality on gastrointestinal secretions may be more important with respect to rehydration than the effects on gastric emptying. An increase in intestinal secretion instead of absorption is observed with the presence of hypertonic fluid in the intestine.

Three different periods of carbohydrate intake can be defined: pre-exercise intake, intake during exercise and post-exercise intake. Carbohydrate beverages are ingested prior to exercise in an attempt to prevent detrimental changes, which can accompany exercise. The efficiency of ingested glucose in enhancing physical performance is dependent on the time at which the beverage is ingested before exercise. Glucose containing beverages produce an increase in plasma glucose peaking approximately 45 minutes after ingestion. The increase in plasma glucose results in an increase in plasma insulin and a subsequent drop in plasma glucose during the initial period of the activity, resulting in quick exhaustion. In contrast, glucose solutions ingested from 5 minutes to immediately prior to exercise result in maintenance of the blood glucose level throughout moderate- to high-intensity exercise. (Nutrition in Exercise and Sport—CRC Press—1990).

The benefits of carbohydrate consumption during exercise have already been touched upon. A general recommendation is that 20 to 60 g of carbohydrate be consumed every hour during prolonged exercise. The post-exercise intake of carbohydrates to enhance recovery from exercise has not been addressed to the same extent as has the use of carbohydrates to enhance performance during exercise. However, it appears that the rate of muscle glycogen re-synthesis is somewhat more rapid during the first 2 h following exercise compared to the 2 to 4 hour period. Therefore a recovering athlete should eat a high carbohydrate containing meal as soon after exercise as practically possible. (E. F. Coyle in Advances in Nutrition and Top Sport—Medicine and Sport Science—Volume 32-1991).

Different compositions for beverages have been described. International patent application WO 91/12734 describes a hypotonic beverage composition comprising an aqueous solution, either carbonated or non-carbonated, electrolytes, carbohydrates, low-caloric sweetener, and edible acid components.

U.S. Pat. No. 4,312,856 to Korduner et al, describes a beverage product adapted for the replacement of liquid and carbohydrates in the human body during heavy exercise. The product is hypotonic and free of monosaccharides. U.S. Pat. No. 5,397,786 to Simone describes a hypotonic rehydration drink, containing per serving unit at least the following compositions:

a) 1 to 100 g of at least one carbohydrate, b) 2 to 2500 mg of at least one electrolyte, c) 0.1 to 750 mg of at least one ammonia neutralizer, d) at least one energy enhancer, e) at least one antioxidant, f) at least one membrane stabilizer, g) at least one neuromuscular function enhancer selected from the group consisting of choline and a higher saturated fatty alcohol, and h) water in a quantity at least sufficient for providing a solution wherein components a) to g) are substantially dissolved and which solution is ready for consumption by drinking. This specific combination of components appears to solve a myriad of symptoms relating to dehydration of the human body.

International patent application WO 95/22562 describes an energy formulation comprising a novel dextrin-type starch having a molecular weight of from about 15,000 to about 10,000,000 and wherein the molecules are heavily branched.

SUMMARY OF THE INVENTION

The present invention discloses an isotonic beverage product for direct increase of the muscular ATP level consisting essentially of a solution of D-ribose and blood glucose increasing monosaccharides and oligosaccharides and/or hydrogenated glucose syrups. Specifically the present invention relates to an isotonic beverage product for direct increase of the muscular ATP level comprising, D-ribose, a blood glucose increasing monosaccharides and, a blood glucose increasing oligosaccharides and/or hydrogenated glucose syrups The isotonic beverage product contains oligosaccharides, which increase the blood glucose level, examples of such oligosaccharides are maltodextrins with DP between 2 and 15, preferably between 2.5 and 7. The oligosaccharide is present in the beverage product at concentrations of 1% to 7% (w/w), preferably between 2 and 5% (w/w). The monosacharide is present at concentrations of 0.2% to 4% (w/w), preferably between 0.5% to 3% (w/w). D-ribose which actively serves to rapidly increase the muscular ATP level is present at concentrations of 0.2% to 5% (w/w), preferably between 0.5% and 4%.

The isotonic beverage product of the present invention is orally taken in before, during or after physical exercise. Oral take is in boli (boluses) of from 100 to 250 ml at time intervals of between 15 and 45 minutes.

The present invention discloses a beverage product, which allows enhanced physical performance due to essentially three different aspects:

increase of the intracellular level of ATP by supplementation of a pentose, especially D-ribose, increase of the blood-glucose level by supplementation of glucose and glucose-polymers and/or hydrogenated glucose syrups, and increasing the water absorption and rehydration by supplementing an essentially isotonic drink. The concentration of the carbohydrates is such that the tonicity (=) measure of the osmotic pressure of a solution relative to the osmotic pressure of the blood fluids) of the blood is the same or is only marginally exceeded. The osmolality of blood usually ranges from about 280 to 310 mOs/kg.

Furthermore the gastric emptying and intestinal absorption can be stimulated by sodium ions supplementation in the beverage product.

SUMMARY OF THE INVENTION

One object of the present invention is to provide a beverage product, which gives a direct increase of the intracellular level of ATP. It has been found that the administration of D-ribose enhances adenine nucleotide synthesis, thus resulting in a higher availability of 5-phosphoribosyl-1-pyrophosphate, which is the limiting factor of adenine nucleotide biosynthesis. Accordingly, administration of D-ribose prevents and reduces adenine nucleotide decrease in muscles during strong stress conditions. Endogenous synthesis of ATP precursors through purine biosynthetic pathway, the major normal route of synthesis, proceeds slowly, is metabolically demanding, and thus limits ATP recovery. It is now disclosed that D-ribose is an important ATP precursor to provide, and is capable of enhancing and maintaining recovery of ATP. However, during the administration of D-ribose, the blood glucose level was found to be reduced. This reduction of blood glucose may result in symptoms of hypoglycaemia.

It is therefore another object of the present invention to achieve a beverage product which comprises blood glucose level-increasing carbohydrates in an amount adapted to the blood glucose lowering effect of D-ribose and in such concentration that gastric emptying is not impaired. Furthermore, the concentration of the blood glucose leve-increasing carbohydrates is adapted to be able to perform enhanced physical performance of different kinds.

A blood glucose level-increasing component is therefore an essential component of the beverage product of the present invention. In general blood glucose level is increased by uptake of carbohydrates, such as glucose or glucose polymers. In the beverage product according to the invention a mixture of D-ribose and blood glucose increasing carbohydrate or carbohydrate mixtures is used.

Specifically, the beverage product contains D-ribose and glucose and oligosaccharides and/or hydrogenated glucose syrups. The oligosaccharides or glucose polymers preferably are in chains having a degree of polymerisation of between 2 and 15, and which pass as a chain through the stomach before breaking down.

The glucose polymer is responsible for the glycogen repletion, while the D-ribose directly increases the ATP level. Free glucose can be added to directly increase the blood glucose level.

This invention is related to special compositions of beverages, which can be taken either before, or during the course of the strenuous event, or just after it to replete the glycogen stores. Prior to exercise it is advisable to use a large bolus (300 to 400 ml) of the isotonic drink, while during exercise the smaller boli (100–250 ml) should be sufficient to maintain the blood glucose level and allow for a sufficient intake of liquid and of D-ribose, to increase directly the ATP-level. The oral administration of D-ribose will be between 10 to 120 g pro day, preferably between 45 and 85 g of D-ribose. Although, the exact amount of optimal intake may vary somewhat depending for example on the exact carbohydrate components and on the ratios between them, in general, with a view to gastric emptying it is preferable to take during exercise and shortly thereafter boli of from 100 to 250 ml, more preferably between 120 and 170 ml.. Drinking should take place every 15 to 45 minutes, preferably every 20 to 30 minutes. It is evident that this time will vary with the concentration of the different components and also with the intensity of the physical activity.

The beverage product essentially contains carbohydrates in the form of monosaccharides such as glucose in concentrations of 0.2% to 4%, preferably between 0.5% to 3%. Unless otherwise stated the percentages of the present description are expressed as g/100 g of final drink.

The oligosaccharides, being glucose syrups or maltodextrins and/or hydrogenated glucose syrups are present in the beverage product in concentrations of 1% to 7% (w/w), preferably between 2% and 5% (w/w).

The D-ribose concentration in the beverage product is essentially present at concentrations of 0.2% to 5% (w/w), preferably between 0.5% and 4% (w/w).

Other ingredients can be comprised in the beverage product to obtain a nicely flavoured drink by adding some flavouring agents; sodium salt can be added to stimulated the glucose uptake; magnesium ions can be included since they are claimed to regulate the synthesis and breakdown of ATP. Supplemented phosphate ions will have a beneficial effect in the build-up of ATP levels, while supplementation of hydrolysed wheat gluten will have a beneficial effect in the re-synthesis of glycogen stores (G. Van Hall; Voeding 5, 21-1997). In general it is taken care of that the overall composition is an isotonic drink.

A typical composition of a drink of the present invention is; glucose 1.4%, D-ribose 1.8%, maltodextrin 5%, citric acid 0.10%, trisodium citrate 0.10%, sodiumchloride 0.02%, sodium dihydrogen phosphate 0.02%. The osmolality of this composition was measured to be 283–284 mOs/kg. Coloring agents and flavors may be added in the desired amounts.

U.S. Pat. No. 5,391,550 describes a method to measure the increase of the ATP level. There the procedure for ATP determination is based on the Sigma test kit procedure. ATP assay procedures require that blood cells be ruptured and the ATP level found in such an assay is directly related to the intracellular level of ATP. The procedure for ATP determination is based on the action of the enzyme phosphoglycerate phosphatase to form 1,3-diphosphoglycerate from ATP and 3-phosphoglycerate. The enzyme glyceraldehyde phosphate dehydrogenase catalyses the reaction to form glyceraldehyde-3 phosphate and NAD+P, thus causing a reduction in the absorbance at 340 nm wavelength. The reaction then is limited by the amount of ATP present and the reduction in absorbance is proportional to the ATP present.

The present invention uses the above mentioned method for measuring the ATP level and a computer tomograph to determine the levels of all phosphorylated compounds in vivo. Other methods for determining the ATP level are known and may equally well be employed without departing from the current invention.

The invention is further illustrated by the following examples.

EXAMPLE 1

Randomize controlled double-blind prospective study with cross-over design.
Subjects and Methods:
10 healthy human volunteers age 20–40 years.
The volunteers perform an intensive muscular exercise mainly involving the type II muscle fibres (type I fibres are the oxidative type of fibres in which the ATP level never decreases during regular exercise). The subjects take prior to the exercise, either D-ribose or D-glucose at a constant rate of 200 mg/kg/h in a double blind design. Prior to, immediately after, and at certain time intervals after the exercise, the in vivo intracellular level of energy-rich phosphates (such as CP, ATP, ADP and AMP) are measured by phosphor MR spectroscopy.

The following day the experiment is repeated and the volunteers take the second sugar.

Post-treatment levels of energy-rich phosphate containing compounds are expected to be significantly higher after administration of D-ribose then when glucose is used.

EXAMPLE 2

During this experiment the subjects are supplemented with a typical beverage composition and the blood glucose level, insulin level and ATP level is measured. In a control experiment the subjects are supplemented with beverage compositions either containing D-ribose alone, D-ribose+maltodextrin, or D-ribose+free glucose. Care is taken that all supplemented drinks are not hypertonic drinks to cope with gastric emptying effects.

The compositions of the present invention are expected to show increased levels of energy-rich phosphate containing compounds in comparison with beverages without D-ribose. Moreover the compositions of the present invention show an increased blood glucose level.

What is claimed is:

1. An isotonic beverage product comprising:
    an intracellular muscle ATP increasing amount of D-ribose present at a concentration of 0.2% to 5% (w/w),
    a blood glucose increasing amount of glucose present at a concentration of 0.2% to 4% (w/w),
    a blood glucose increasing amount of maltodextrin having a DP between 2 and 15 and present at a concentration of 1% to 7% (w/w).

2. An isotonic beverage product according to claim 1, wherein the maltodextrine has a DP between 2.5 and 7.

3. An isotonic beverage product according to claim 1, wherein the glucose is present in at a concentration of between 0.5% and 3% (w/w).

4. An isotonic beverage product according to claim 1, wherein the maltodextrin is present in the beverage product at a concentration of between 2 and 5% (w/w).

5. An isotonic beverage product according to claim 1, wherein the D-ribose is present at a concentration of between 0.5% and 4% (w/w).

6. An isotonic beverage product according to claim 1, wherein said beverage product comprises:
   glucose in a concentration of 1.4% (w/w),
   D-ribose in a concentration of 1.8% (w/w),
   a maltodextrin in a concentration of 5% (w/w),
   citric acid in a concentration of 0.10% (w/w),
   trisodium citrate in a concentration of 0.10% (w/w),
   sodium chloride in a concentration of 0.02% (w/w),
   sodium dihydrogen phosphate in a concentration of 0.02% (w/w), and
   optionally, at least one of a coloring agent or flavoring agent.

7. A method for increasing the production of the energy carrier ATP comprising orally administering an isotonic beverage product according to claim 1 to a patient before, during or after said patient engages in physical exercise.

8. A method according to claim 7, wherein said oral administration comprises administering to said patient boluses of from 100 to 250 mls at intervals of between 15 and 45 minutes to said patient.

* * * * *